US006571175B1

(12) United States Patent
Chen

(10) Patent No.: US 6,571,175 B1
(45) Date of Patent: May 27, 2003

(54) NAVIGATION METHOD USING NEEDLE INDICATING DISPLAY

(75) Inventor: Stephen Chen, Chang-Hua (TW)

(73) Assignee: E-Lead Electronics Co., Ltd., Chang-Hua (TW)

( * ) Notice: Subject to any disclaimer, the term of this patent is extended or adjusted under 35 U.S.C. 154(b) by 0 days.

(21) Appl. No.: 09/987,072

(22) Filed: Nov. 13, 2001

(51) Int. Cl.[7] .............................................. G01C 21/30
(52) U.S. Cl. ..................... 701/211; 701/200; 73/178 R; 340/990; 340/995
(58) Field of Search ................................. 701/211, 200; 73/178 R; 340/990, 995

(56) References Cited

U.S. PATENT DOCUMENTS

| | | | | |
|---|---|---|---|---|
| 4,513,378 A | * | 4/1985 | Antkowiak ................. 342/389 |
| 5,874,905 A | * | 2/1999 | Nanba et al. ............... 340/988 |
| 5,941,930 A | * | 8/1999 | Morimoto et al. .......... 340/990 |
| 5,983,158 A | * | 11/1999 | Suzuki et al. .............. 340/988 |
| 6,018,697 A | * | 1/2000 | Morimoto et al. .......... 340/988 |
| 6,034,626 A | * | 3/2000 | Maekawa et al. .......... 340/990 |
| 6,115,669 A | * | 9/2000 | Watanabe et al. .......... 340/988 |
| 6,243,646 B1 | * | 6/2001 | Ozaki et al. ................ 701/201 |
| 6,266,613 B1 | * | 7/2001 | Nimura et al. ............. 340/990 |
| 6,269,304 B1 | * | 7/2001 | Kaji et al. .................... 342/70 |
| 6,304,212 B1 | * | 10/2001 | Aoki et al. ............. 342/357.13 |
| 6,346,938 B1 | * | 2/2002 | Chan et al. ................. 345/419 |
| 6,347,280 B1 | * | 2/2002 | Inoue et al. ................ 340/910 |

* cited by examiner

Primary Examiner—William A. Cuchlinski, Jr.
Assistant Examiner—Olga Hernandez
(74) Attorney, Agent, or Firm—Troxell Law Office PLLC

(57) ABSTRACT

A needle indicating navigation method, particularly relates to one using a monitor type display in combination with navigation equipment to transform navigational information into readable traveling routes messages on a screen of a display indicated by clock-like pointing needles for vehicle drivers. It mainly integrates into line connection the navigation equipment, wireless communication devices, navigation service centers or other information devices which can offer calculated traveling routes information whereby traveling route messages can be transmitted from a navigation service center or a self provided navigation program in a piece of navigation equipment to drivers on vehicles equipped with a display monitor, or by way of the connection of the information device and the navigation equipment to offer calculated traveling routes information. The message is illustrated on a screen of the display monitor by clock-like pointing needles which respectively provide the various navigation messages, such as the locations of next turns, and the directions of the next turns, the directions toward the destination, the distances, the orientations, and etc respectively. Thus, detailed navigational information can be simply displayed on a limited space of a display monitor for driver to read with speed and ease.

13 Claims, 10 Drawing Sheets

NAVIGATION METHOD USING NEEDLE INDICATING DISPLAY

BACKGROUND OF THE INVENTION

The present invention relates to a needle indicating navigation method, particularly to a method using a monitor type display in combination with navigation equipment to transform navigational information into readable traveling routes messages on a screen of a display indicated by clock-like pointing needles for vehicle drivers. It mainly integrates into line connection the navigation equipment, wireless communication devices, navigation service centers or other information devices which can offer calculated traveling routes information whereby traveling route messages can be transmitted from a navigation service center or a self provided navigation program in a piece of navigation equipment to drivers on vehicles equipped with a display monitor, or by way of the connection of the information devices and the navigation equipment to offer calculated traveling routes information. The message is illustrated on a screen of the display monitor by clock-like pointing needles which respectively provide the various navigation messages, such as the locations of next turns, and the directions of the next turns, the directions toward the destination, the distances, the orientations, and etc respectively. Thus, detailed navigational information can be simply displayed on a limited space of a display monitor for driver to read with speed and ease.

Technological advances in many fields make the provision of scientific devices for civilian usage possible. For instance, navigation systems originally applied only to the navigation of aircraft or for military purposes have been open to civilian and industrious usage for many years. In particular, a piece of navigation equipment is widely applied to vehicles of all kinds as a standard piece of equipment. However, a general navigation equipment is equipped with a small-sized LCD display to show the related road conditions and navigation messages for drivers thereon. All the ways of displaying the navigation messages are generally the same only with litter difference. The positions of a moving target vehicle are all continuously shown on a display by a spot, which is moving from point to point in response to the travelling route of the vehicle. The size of an LCD display mounted to a vehicle for navigation purpose is limited in such a manner by the interior space of a vehicle as not to interfere with a driver's sight and driving activity. This natural limit results in the complete show of the detailed navigational information either impossible or too crowd. Such a densely displayed monitor makes a driver see the details of navigation messages difficult. It is hard to imagine a driver making effort to search for navigation messages on a monitor densely filled with a detailed map while driving in a busy traffic or in puzzling alleys at the same time. This easily puts a driver in danger of traffic accidents.

The inventor noticed the disadvantages associated with conventional navigation systems and came up with a navigation method using clock-like pointing needles to show all important navigation messages, such as the destination, the type of next turns and the turning directions and the orientations on a travelling route that are respectively displayed. The navigational information is converted into readable messages expressed by way of navigation-based pointing needles, i.e., clock like pointing needles shown on a display monitor whereby easy reading on the navigational information and driving safety can be both advanced effectively.

SUMMARY OF THE INVENTION

Therefore, the primary object of the present invention is to provide a needle indicating navigation method wherein easy illustration of navigation messages, such as the destinations, the type of next turns, distances and orientations can all be effected in a neat manner by way of clock-like pointing needles respectively for drivers' easy reading in driving so as to increase driving safety and navigation facility.

Another object of the present invention is to provide a needle indicating navigation method wherein a combination connection of wireless communication devices, navigation service centers or other information devices which can calculate driving routes and a navigation equipment permits respective navigational information to be converted into a picture display of clock like pointing needles whereby driving information can be widely applicable on line by users.

DETAILED DESCRIPTION OF THE PREFERRED EMBODIMENT

Figure 1:
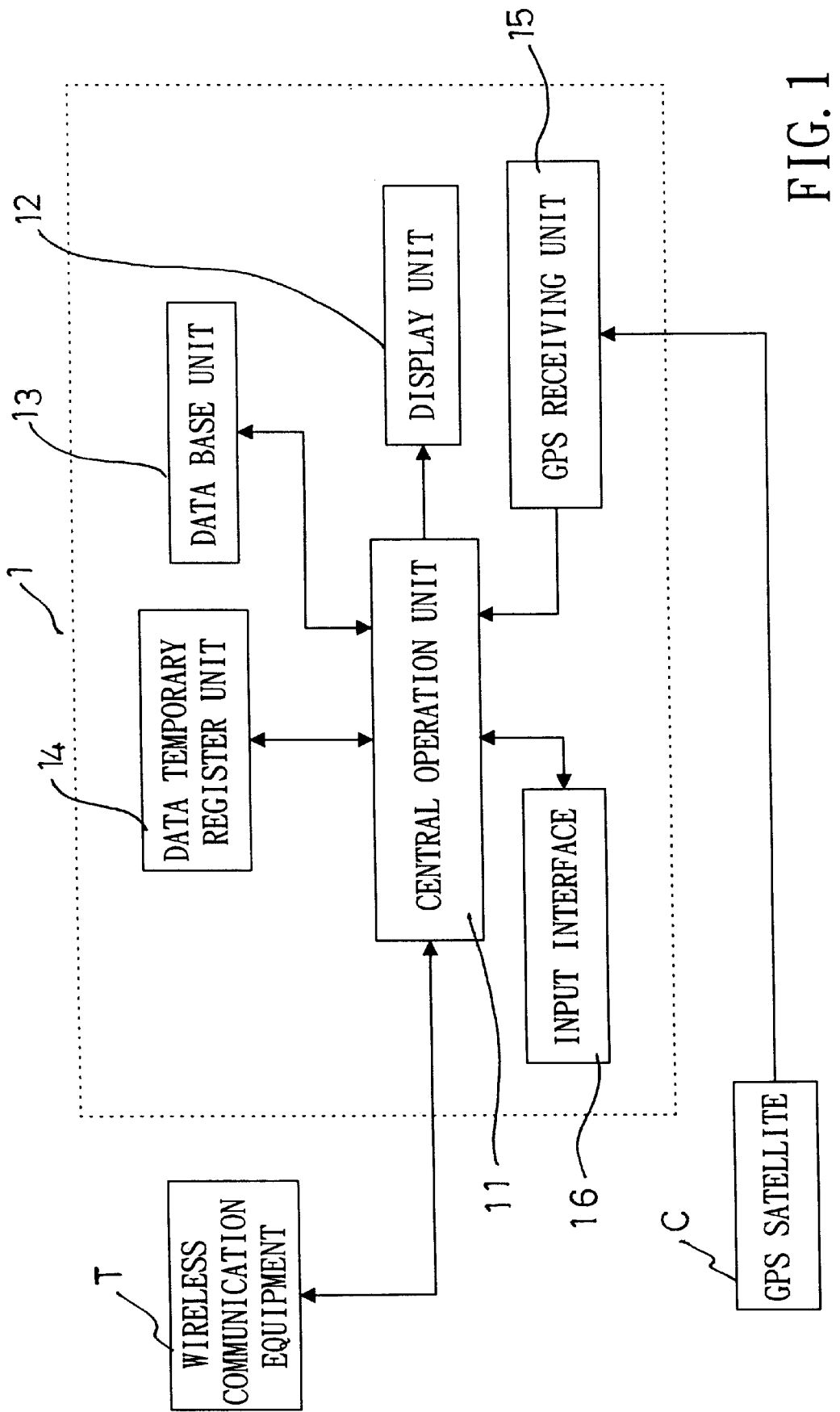
FIG. 1 is a block diagram of the navigation system of the present invention.
Figure 2:
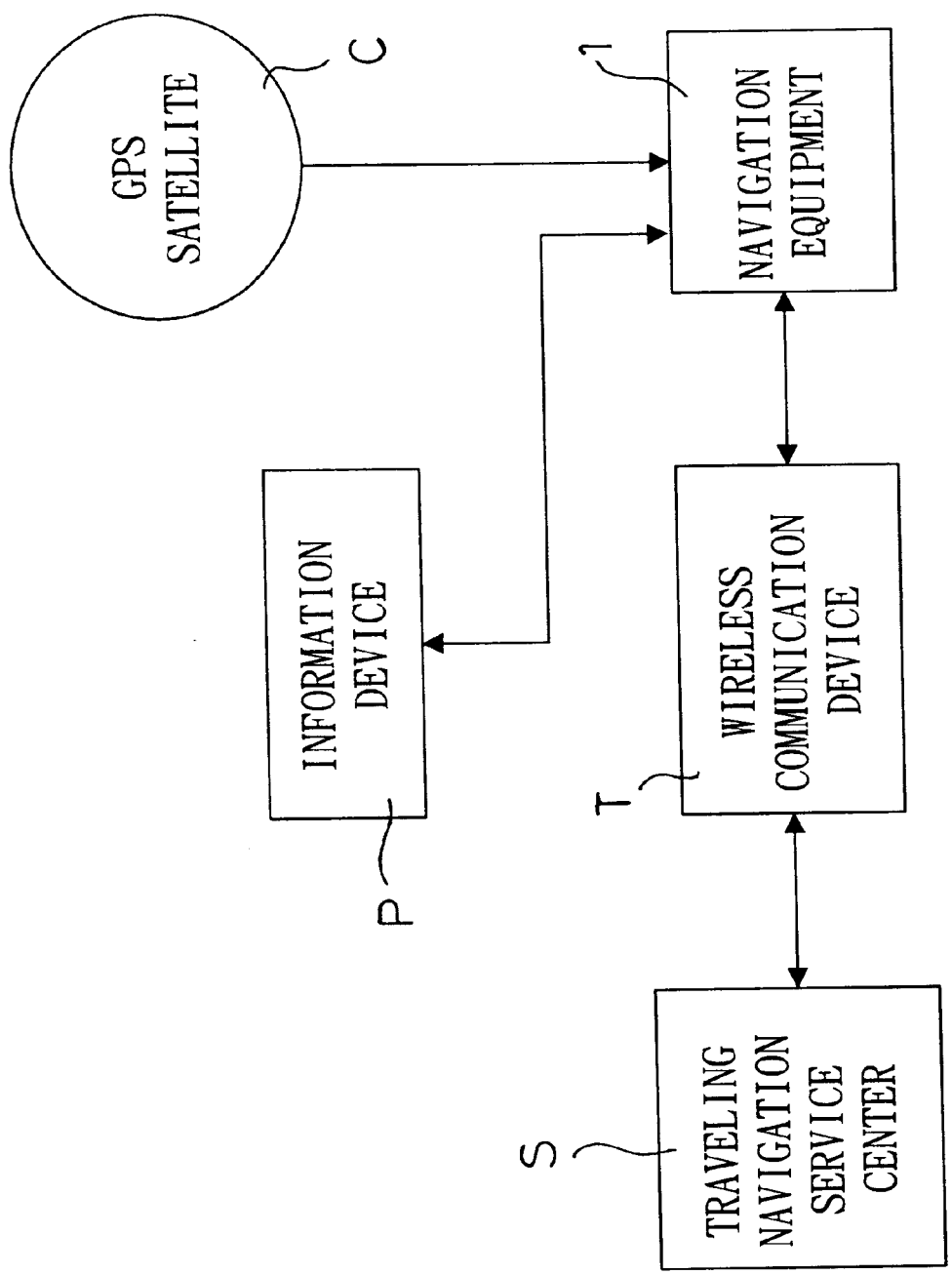
FIG. 2 is a diagram showing the positioning and message transmission of the navigation system of the present invention.
Figure 3A:
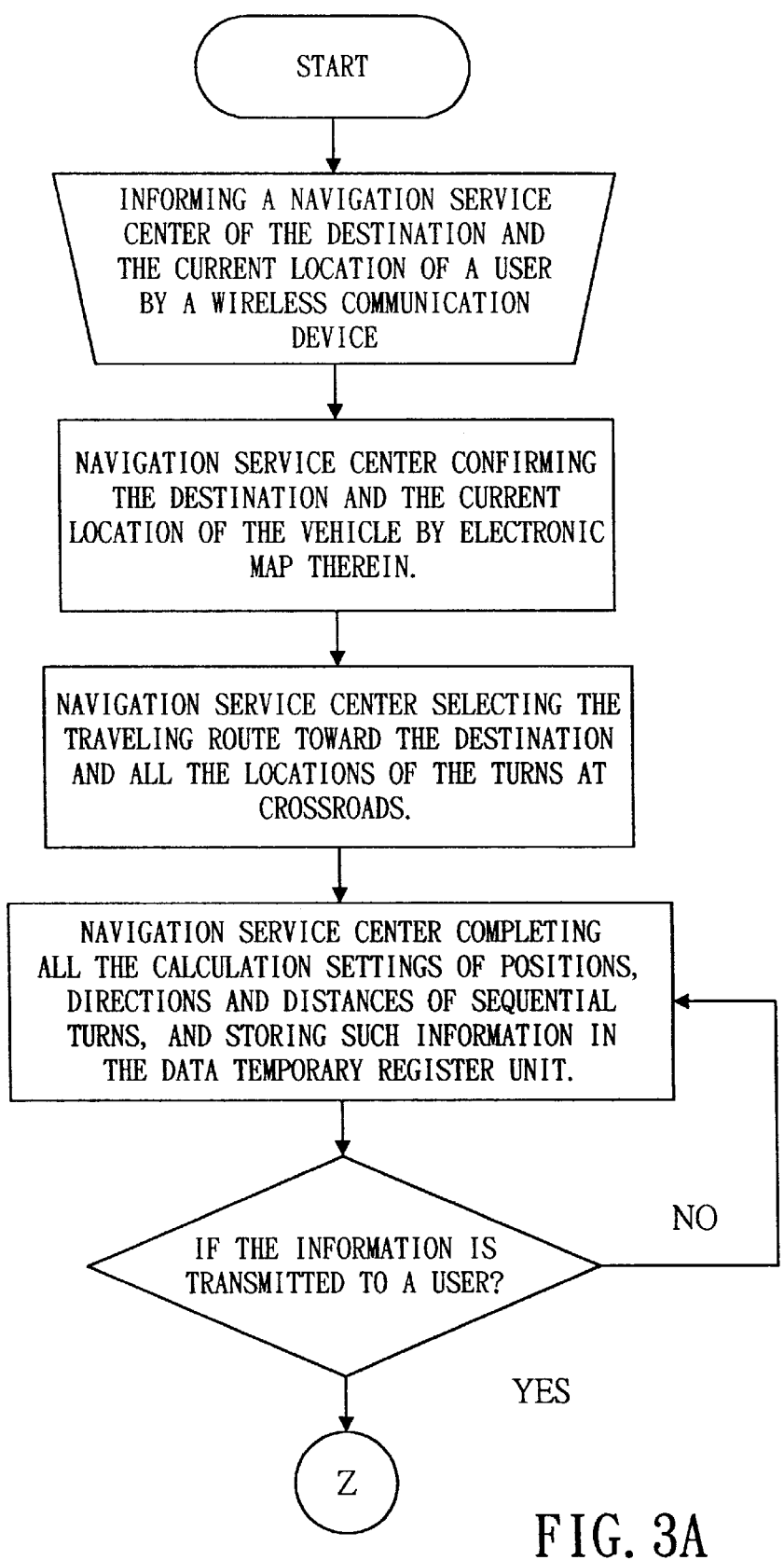
FIGS. 3A and 3B is a first control flow chart of the navigation operation of the first embodiment of the present invention.
Figure 3B:
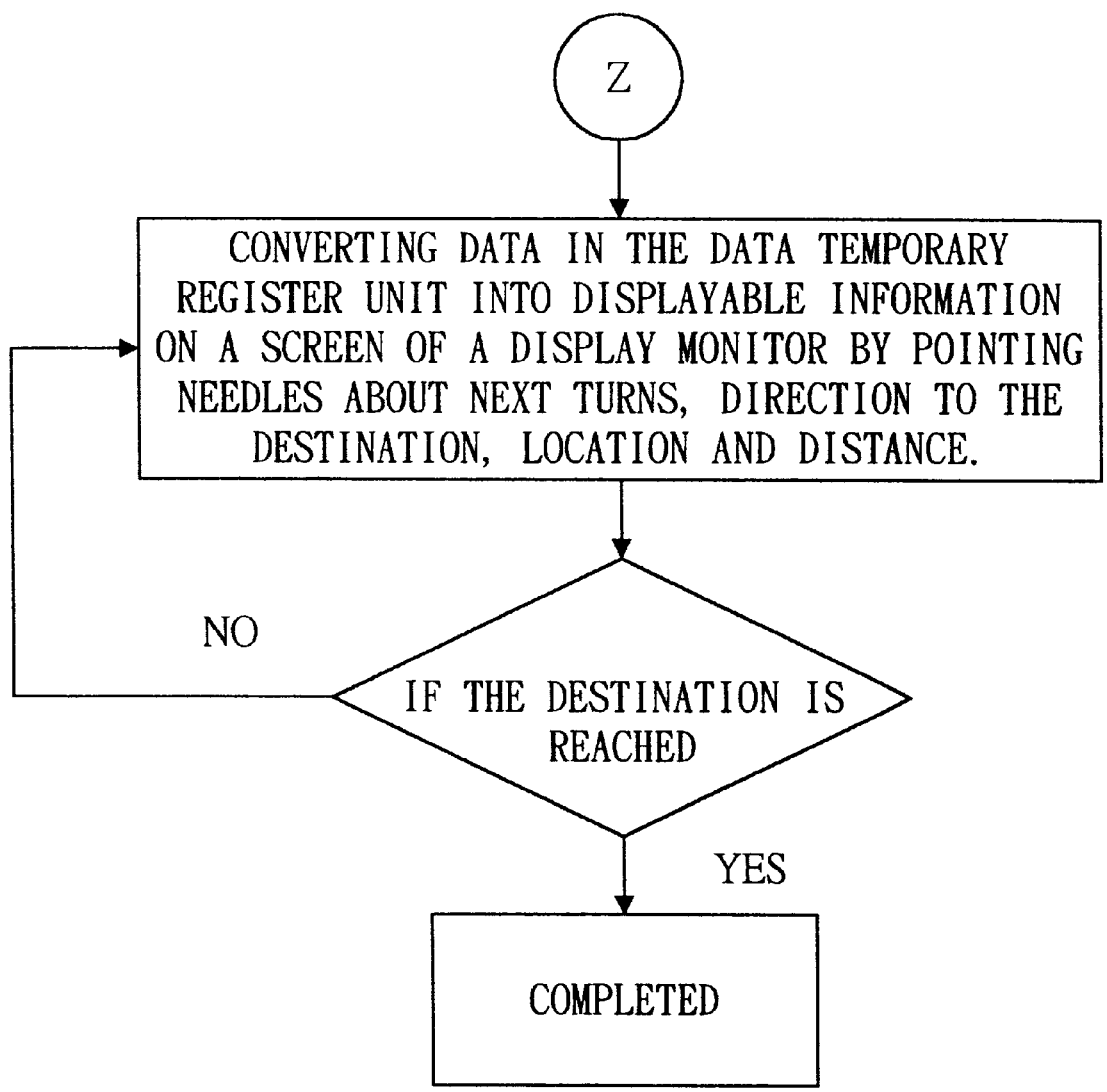

Referring to FIG. 1, the block diagram of the navigation equipment 1 of the present invention is illustrated. This navigation equipment 1 is mainly made up of a central operation unit 11, a display unit 12, a data base unit 13, a data temporary register unit 14, a GPS receiving unit 15 and an input interface 16. The navigation equipment 1 combines with a wireless communication device T, such as a wireless telephone or a cellular phone, a GPS satellite C and a traveling navigation service center S or other information devices P (such as PDA, notebook computer and etc.) to effect transmission of navigational information.

The central operation unit 11 serves to control all the construction units of the present invention and can also self calculate the traveling or driving routes by itself without collaboration with a driving navigation service center S.

The display unit 12 can be a speaker or a monitor for providing map information and navigational information either by acoustic prompt or a display screen.

The data base unit 13 is used to store figurative and character data, at least including the simple diagrams of crossroad patterns (left turn, crossroad . . . and etc.), and bytes for storing prompt words data.

The data temporary register 14 can be a memory unit for storing operation data, driving routes, navigational information and information input by a user or information transmitted from the driving navigation service center S.

The GPS receiving unit 15 is used to receive the positioning information issued by the GPS satellite C.

The input interface 16 can be a press-key matrix, switch, a touch-on monitor, and etc., permitting a user to input data or to get the navigation equipment set.

The navigation equipment 1 made up of the above listed components can cooperate with a wireless communication device T which can be a wireless telephone or a cellular phone, permitting a driver and a driving navigation service center S to be in mutual communication with each other.

The driving navigation service center S at least is equipped with a navigation map, a message receiving and transmitting device (a wireless telephone, a cellular phone and etc.), a driving route calculating system which serves to calculate and provide a driver with driving route information.

Referring to FIGS. 2, 3A, 3B and 6, when a driver is in need of navigational services, the position of the driver's vehicle is first pinpointed by way of the GPS receiving unit 15 and the input interface 16; and then the positioning information and the selected destination are transmitted to a navigation service center S by the user in request for traveling routes by way of the wireless communication device T. Or a central operation unit 11 of the navigation equipment 1 comes up with on its own the best traveling route, or other information devices P provide the navigation equipment 1 with calculated traveling routes information, that is shown on the screen 120 of a display unit 12. As the operation of a GPS is a prior art and is not the concern of the present invention, it is not described in the specification.

The flow of the operation procedures in cooperation with a navigation service center is stated as follows:
1. The user makes use of the GPS receiving unit 15 of the navigation equipment 1 to receive signals transmitted from GPS satellite C to mark his (her) position and next informs the traveling navigation service center S of the selected destination by way of the wireless communication device T. The currently known prior navigation methods all self calculate a suit driving route and do not employ a driving navigation service center, so it is not necessary to make detailed description of such a prior art. At the same time, the information of the user's position, which is self-calculated by the navigation equipment, is transmitted to the service center.
2. The driving navigation service center S confirms the selected destination and the current position of the user's vehicle.
3. The driving navigation service center S determines a route leading to the selected destination and all the location of the turns at crossroads.
4. The driving navigation service center S completes all the calculating operations to set every location, direction and distance of all turns in a selected route, and all the messages are transmitted down to the user by way of the wireless communication device T.
5. If the transmission of information to the user is finished, the next procedure is further carried out, otherwise, the step 4 is repeated. (If the user makes use of a self-provided navigation, this step is omitted.)
6. The vehicle-mounted navigation equipment 1 accordingly converts the signals from the driving navigation service center S into displayable messages on a screen of a display; i.e., using clock-like pointing needles to indicate all the next turns of a selected route, the directions of the destination, locations and distances.
7. Judging if the user has reached the destination, if yes, the navigation procedure is terminated; and if not, the step 6 is repeated.

Figure 4A:
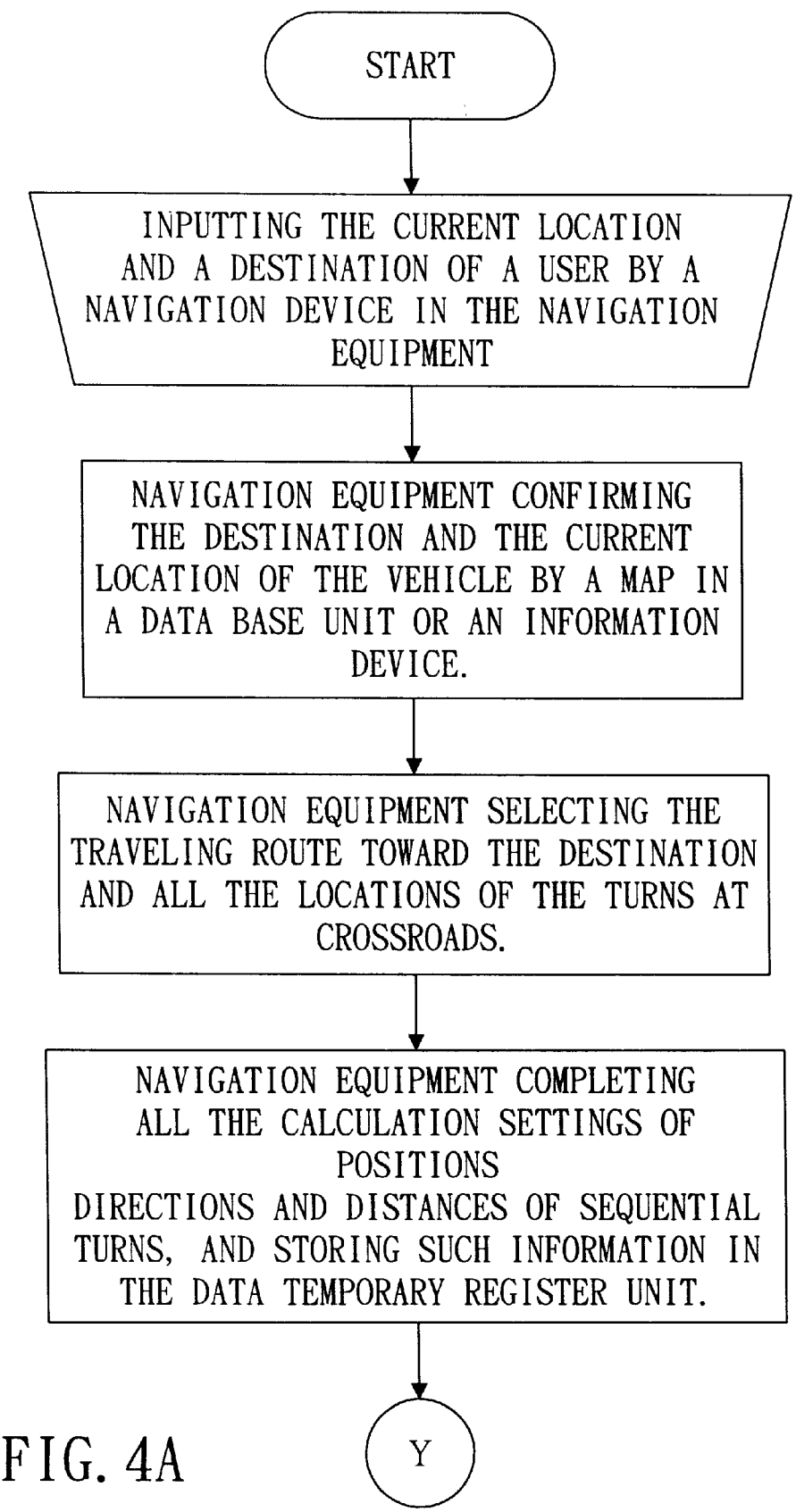
FIGS. 4A and 4B is a second control flow chart of the navigation operation of the present invention of another embodiment.
Figure 4B:
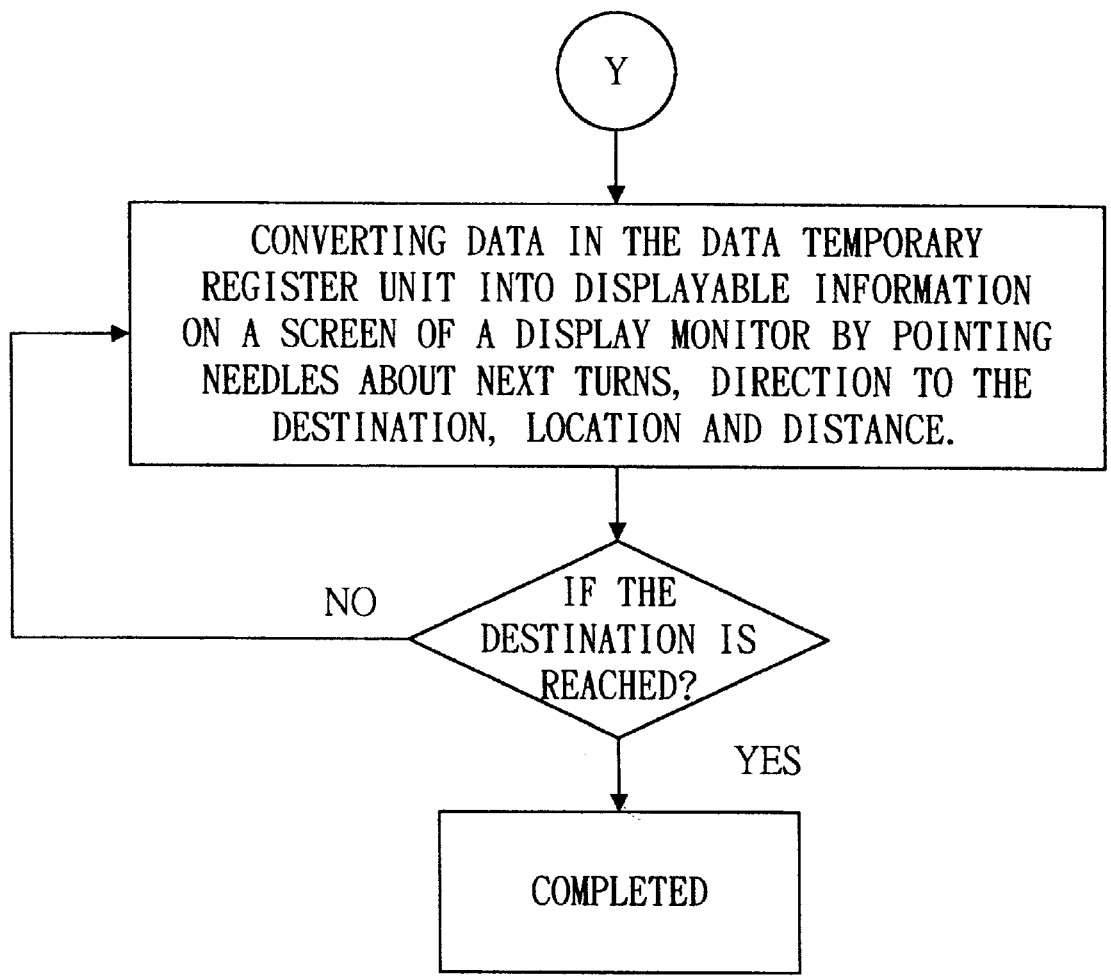

Referring to FIGS. 4A and 4B, if no driving navigation service center is available and a self provided navigation or other information devices P are used, the following operation procedure is carried out:
1. The user makes use of the GPS receiving unit 15 of the navigation equipment 1 to receive signals transmitted from GPS satellite C to mark his (her) position and set a destination by way of the input interface 16.
2. The navigation equipment identifies the destination and the current position of the user's vehicle according to the electronic map of the data base unit.
3. The navigation equipment determines the driving route leading to the destination and all the locations of turns at crossroads, and sets the calculation of the position, direction and distance of each crossroad; and the information is temporarily stored in the temporary data register unit.
4. The vehicle-mounted navigation equipment converts the data stored in the data temporary register unit accordingly into displayable pictures on the screen of the display monitor; i.e., the pieces of information on the next turns, the directions, locations and distances of the destination are all expressed by way of clock-like indicating needles respectively.
5. Judging if the user reaches the destination; if yes, the navigation is terminated; otherwise, the step 4 is repeated.

Figure 6:
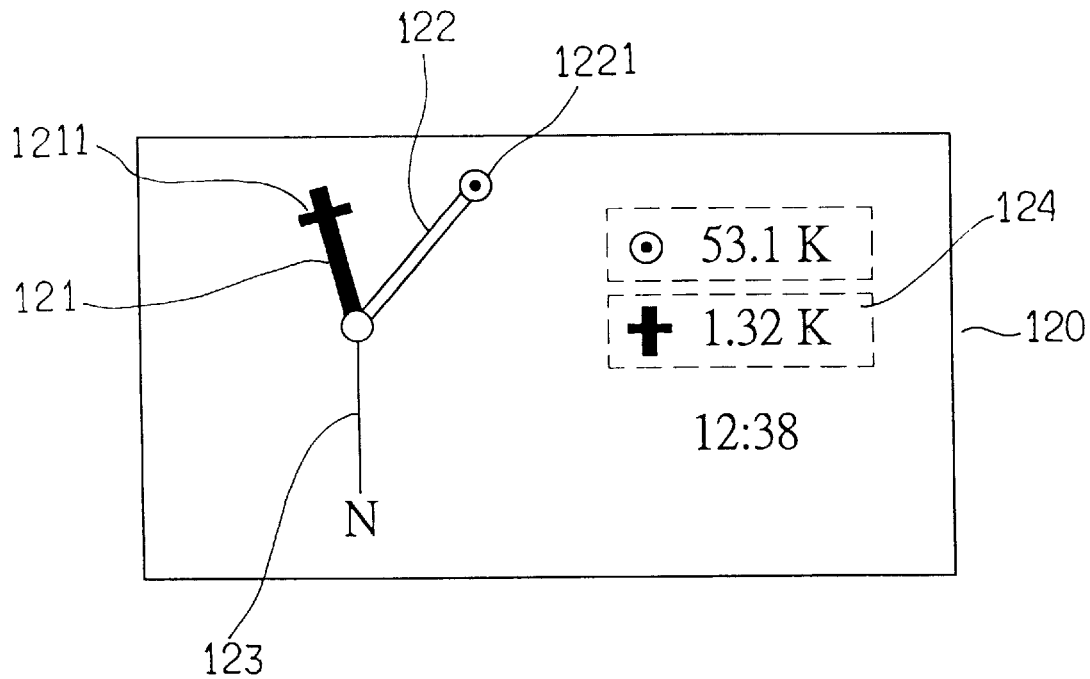
FIG. 6 is a diagram showing the first type of illustration on a screen of a display of the present invention.
Figure 7:
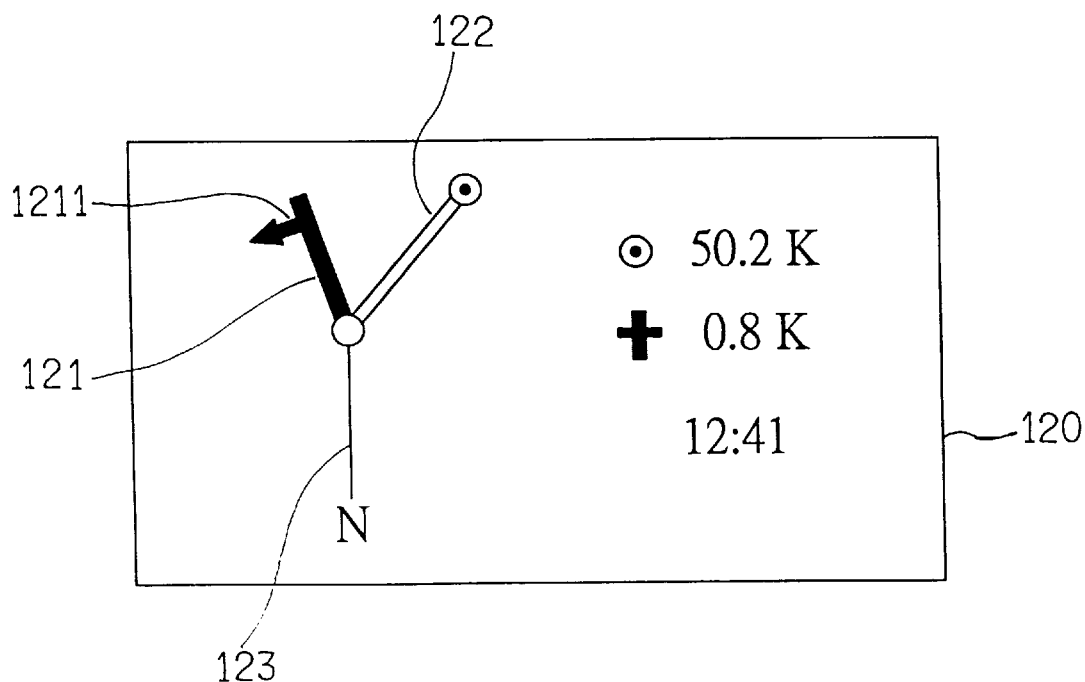
FIG. 7 is a diagram showing the second type of illustration on a screen thereof.

The indication method adopted in the present invention is as shown in FIG. 6. It mainly intends to show on a screen 1202 of the display monitor 12 navigational information by way of clock-like pointing needles including at least a first pointing needle showing the turning direction at a next crossroad, a second pointing needle used to indicate the direction toward a target place, that combination constitutes the basic frame of a navigation display screen and needles can be added or removed according to the practical necessity of navigation; wherein the first pointing needle is marked by numeral 121, the second pointing needle 122 and the third pointing needle 123. They stand for respectively as follows:
1. The first pointing needle 121 is used to indicate the direction of a next turn, the direction in which a driver is currently facing to. The tail 1211 of the first pointing needle 121 indicates the type of the next turn at a crossroad, for instance, a crossroad, a fork intersection and etc., and the turning direction, as demonstrated by the tail 1211 of the first pointing needle 121 in FIG. 6.
2. The second pointing needle 122 points to a direction of the selected destination (in reference to a direction to which a driver is facing), and the end 1221 of the second pointing needle 122 indicates the location of the destination.
3. The third pointing needle 123 points to the orientation N (or a particular orientation).
4. In a proper area of a display screen 120 is disposed a block area 124 to show the distance to the destination and the next turn indicated by the first pointing needle 121 and the second pointing needle 122. For instance, as shown in FIG. 6, the marked number ⊚ 53.1 K stands for the distance from the destination being 53.1 kilometers and +1.32 K represents the distance to the next turn being 1.32 kilometers.

Figure 5:
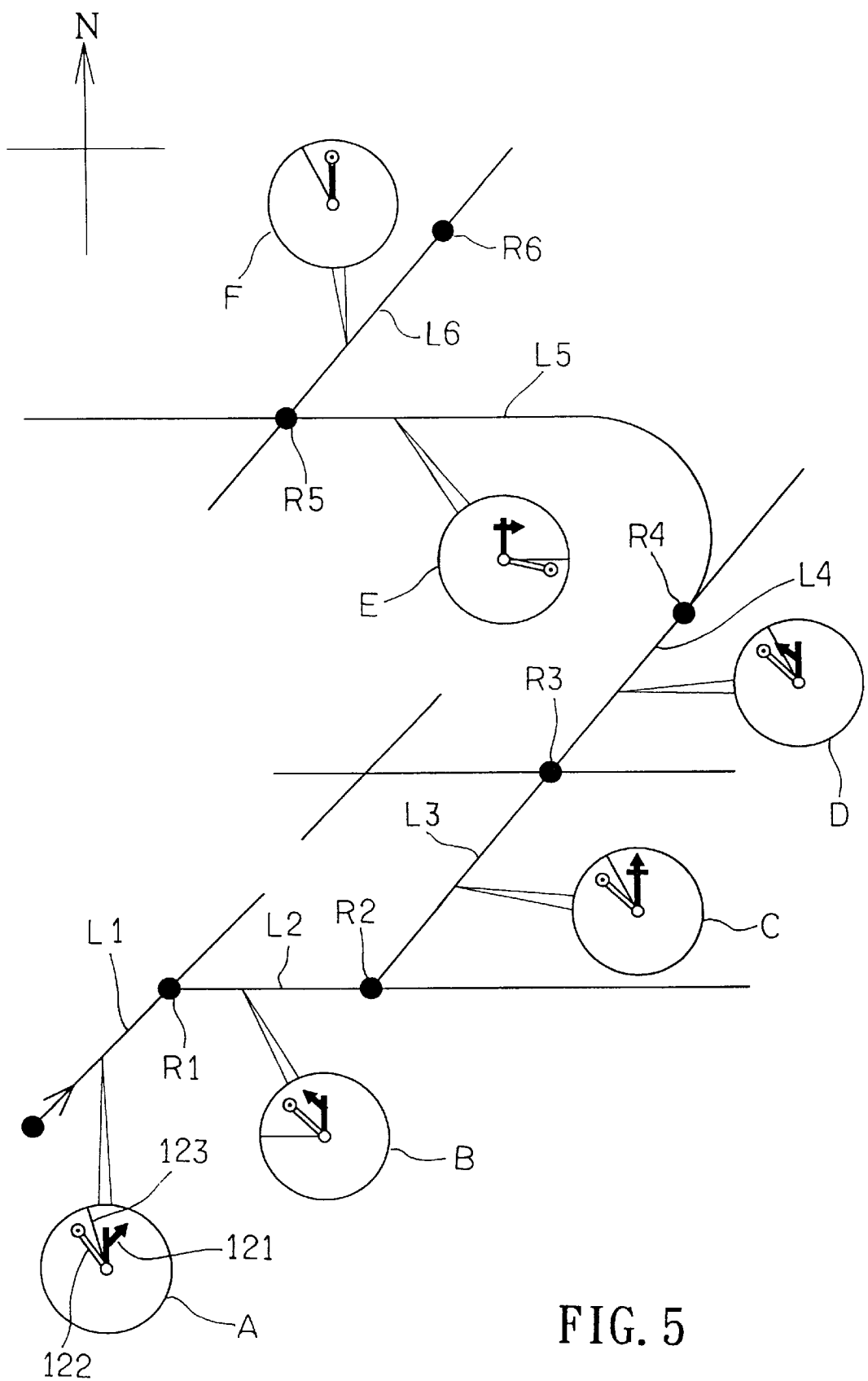
FIG. 5 is a diagram showing the travelling route of a vehicle and the corresponding needle indicating displays of the navigational information.

Referring to FIG. 5, a number of real road sections are used to demonstrate the practical use of the navigation method of the present invention. As a vehicle is moving on different road sections L1, L2, L3, L4, L5, L6, each consecutive turn between the road sections R1, R2, R3, R4 and R5, the message shown on the display screen of the monitor is as illustrated in the FIG. 5. The individual navigation indications at each road section are shown by the circled areas A, B, C, D, E, F; wherein the first pointing needle provides the turning direction at a next turn (in reference to the forward direction of the moving vehicle), and the second pointing needle indicates the direction toward the destination, and the third pointing needle points to the North or another specific direction. In that case, the pattern or type and the turning direction at a crossroad differ from one another at the respective road sections, and there are various expressions shown on the display screen, such as A, B, C, D, E, F.

The first pointing needle 121 indicates the turning direction at a next turn (in reference to a facing direction of a driver of a vehicle). At the tail 1211 of the first pointing needle 121, the message concerning the type or pattern of a next crossroad is provided. The second pointing needle 122 always points to the destination R6. The third pointing needle 123 points to the North or to a specific direction. As a vehicle is moving, the pointing directions of the first and second pointing needles 121, 122 will vary accordingly in response to the variation of the instant directions of a moving vehicle so as to provide correct navigational information.

Figure 8:
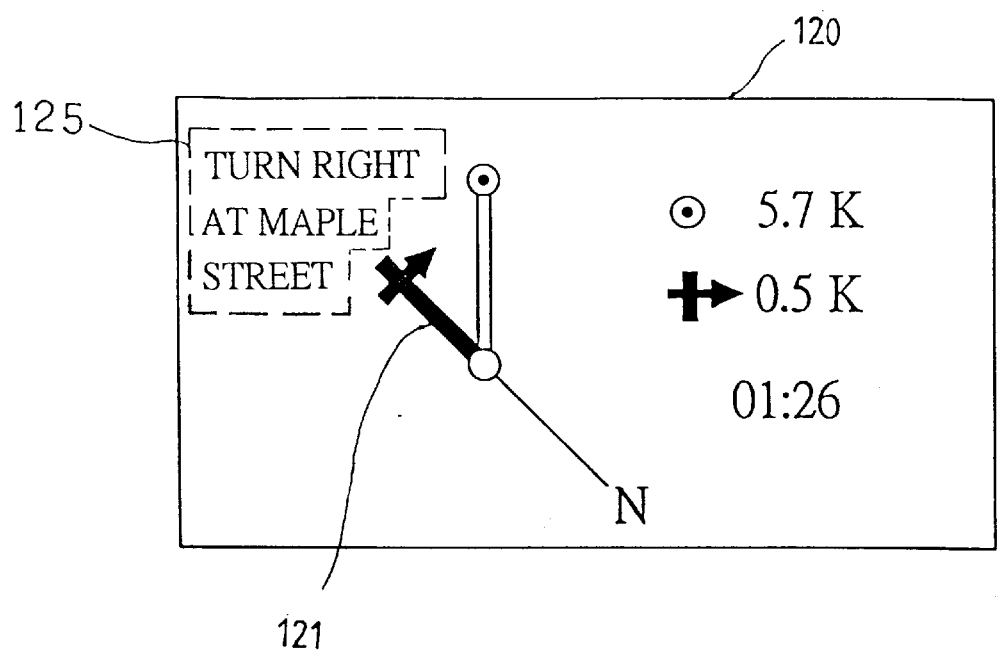
FIG. 8 is a diagram showing the third type of illustration on a screen thereof.
Figure 10:
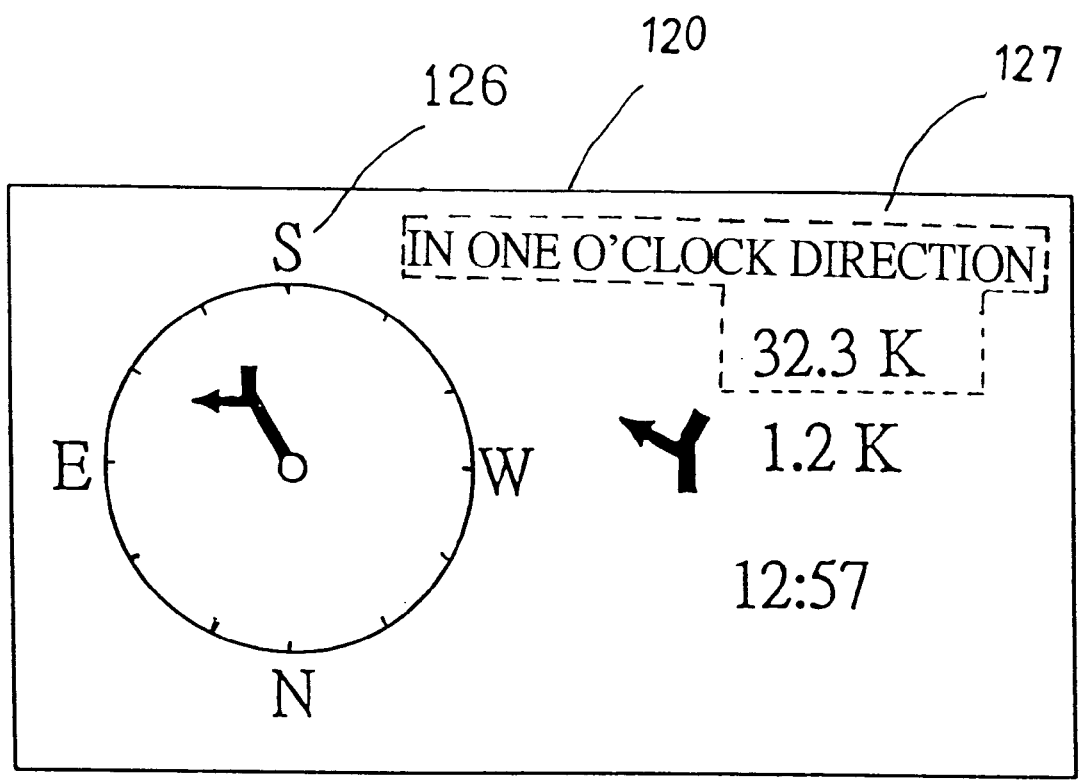
FIG. 10 is a diagram showing the fifth type of illustration on a screen thereof.

Referring to FIG. 8, another embodiment of the present invention is illustrated. To facilitate navigation, the present invention can put a string of words 125 on the display screen 120 about the external periphery adjacent to the first pointing needle 121, such as the name of a related road and the turning direction at a next turn, to further remind a driver of the navigational information. As to the second pointing needle, serving to point at the direction of a target destination or place, it can be removed in order to make the display screen 120 look simpler and be replaced by a string of navigation words 127, for instance "in the direction of one o'clock, at a distance of 32.3 K", as shown in FIG. 10.

Figure 9:
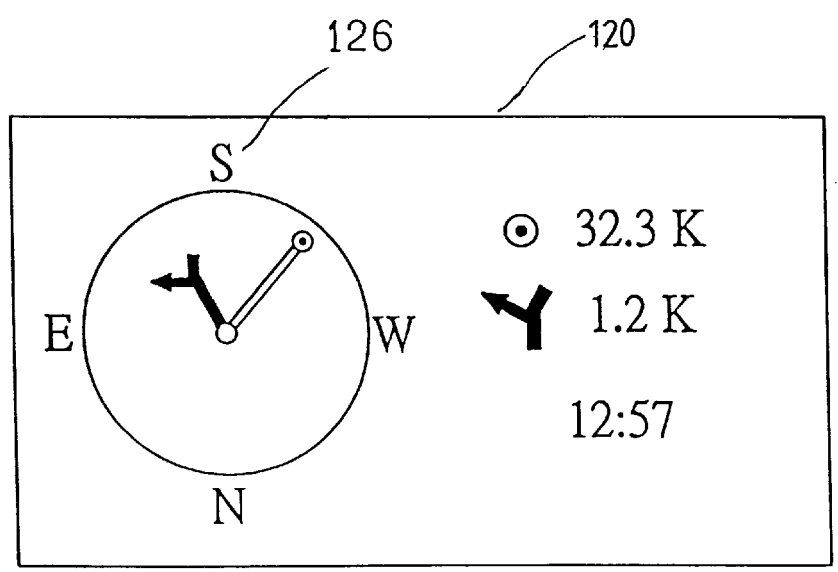
FIG. 9 is a diagram showing the fourth type of illustration on a screen thereof.

Moreover, to help a driver in the judgement of the orientations, the third pointing needle 123 can be replaced by letters 126 E, W, S, N on the screen 120 which stand for the east, west, south and north as shown in FIG. 9.

In summary, the needle indicating method of the present invention can show the navigational information, such as the types of crossroads, the turning directions and distances in a simple way so as to avoid putting messages on a small size display monitor in a dense and crowd manner, resulting in difficult reading on navigation messages. Thus, it can effectively advance driving safety.

The previous description of the preferred embodiments is only used to present the operation modes of the present method of the invention, and is not limited of its scope of practical use. Any amendments, modifications and variations on this method should be regarded to fall within the scope of the present invention.

I claim:

1. A navigation system comprising needle pointing indicators on a main navigation display screen wherein all navigational information on a traveling route for a vehicle are indicated by at least: a first pointing needle on the display screen indicating a turning direction at a next turn; and a second pointing needle indicating an instant direction toward a selected or target destination, providing easy reading of navigational guidance for vehicle drivers.

2. The navigation system as claimed in claim 1 further comprising a device converting driving navigation information into messages displayed on the display screen of s aid monitor by way of said pointing needles.

3. The navigation system as claimed in claim 1 further comprising a third pointing needle on said display screen to indicate a specific orientation.

4. The navigation system as claimed in claim 1 wherein said display screen includes blocked areas providing information on distances to a next turn and to a destination respectively in cooperation with said first pointing needle and said second pointing needle.

5. The navigation system as claimed in claim 4 wherein said blocked area is adjacent to said first pointing needle and provides information on a name of a road at a next turn and a turning direction at said next turn.

6. The navigation system as claimed in claim 1 wherein said main navigation display screen displays letters E, W, S and N indicating east, west, south and north directions, respectively.

7. The navigation system as claimed in claim 1 wherein an end of said first pointing needle has a diagram to indicate a pattern of a next turn and a turning direction at said next turn.

8. The navigation system as claimed in claim 1 wherein said main navigation display screen displays words indicating an orientation toward a destination.

9. The navigation system as claimed in claim 2 further comprising a third pointing needle on said display screen to indicate a specific orientation.

10. The navigation system as claimed in claim 2 wherein said display screen includes blocked areas providing information on distances to a next turn and to a destination respectively in cooperation with said first pointing needle and said second pointing needle.

11. The navigation system as claimed in claim 2 wherein said main navigational display screen displays letters E, W, S and N indicating east, west, south and north directions, respectively.

12. The navigation system as claimed in claim 2 wherein an end of said first pointing needle has a diagram to indicate a pattern of a next turn and a turning direction at said next turn.

13. The navigation system as claimed in claim 2 wherein said main navigational display screen displays words indicating an orientation toward a destination.

* * * * *